US012178768B2

(12) United States Patent
McKearin

(10) Patent No.: US 12,178,768 B2
(45) Date of Patent: Dec. 31, 2024

(54) DISABILITY STANDING DEVICE

(71) Applicant: Silvia Elena McKearin, Spring, TX (US)

(72) Inventor: Silvia Elena McKearin, Spring, TX (US)

(73) Assignee: Silvia Elena McKearin, Spring, TX (US)

( * ) Notice: Subject to any disclaimer, the term of this patent is extended or adjusted under 35 U.S.C. 154(b) by 0 days.

(21) Appl. No.: 17/477,840

(22) Filed: Sep. 17, 2021

(65) Prior Publication Data

US 2023/0098297 A1 Mar. 30, 2023

(51) Int. Cl.

| | |
|---|---|
| ***A61G 7/005*** | (2006.01) |
| ***A61G 7/075*** | (2006.01) |
| ***A61H 1/02*** | (2006.01) |
| ***A63B 23/00*** | (2006.01) |

(52) U.S. Cl.

CPC .......... *A61G 7/005* (2013.01); *A61G 7/0755* (2013.01); *A61H 1/0218* (2013.01); *A61H 1/0229* (2013.01); *A61H 2201/1642* (2013.01); *A61H 2203/0493* (2013.01); *A63B 2023/006* (2013.01)

(58) Field of Classification Search

CPC .......... A61H 1/0218; A61H 2203/0493; A61H 2203/0481; A61H 1/0292; A61H 2201/1642; A61H 1/0229; A61H 2201/10; A61H 2201/165; A61H 23/0263; A61G 7/005; A61G 7/0755; A63B 23/0211; A63B 23/0233; A63B 2023/006

USPC ........ 482/144, 145, 143, 146; 601/23; 5/408

See application file for complete search history.

(56) References Cited

U.S. PATENT DOCUMENTS 7,625,326 B2 * 12/2009 Teeter .................. A61H 1/0218
482/145

FOREIGN PATENT DOCUMENTS

WO WO-2011060273 A1 * 5/2011 ............. A61G 1/013

* cited by examiner

*Primary Examiner* — David R Hare
*Assistant Examiner* — Madison Emanski

(57) ABSTRACT

A disability standing device has a mounting bracket with strap holes, arm rests, an ankle clamp assembly, wheels with locks, a support rod, grip handles, a grip bar and a locking device. The mounting bracket has a rear supporting frame, a front supporting frame, arms rests for the user, grip handles for the assistant to push or pull the device for mobility, a grip bar for the assistant to pull the backrest in an up or downward motion and a locking device to lock the backrest into the desired position. Wherein the rear support frame houses the support rod to limit a patient's motion beyond being parallel with the floor so that their feet are limited to raising above parallel with the floor.

3 Claims, 4 Drawing Sheets

DISABILITY STANDING DEVICE

BACKGROUND OF THE INVENTION

1. Field of the Invention

The present invention relates to an inversion table and spine board, more particularly, having wheels for mobility, bordering holes for placement of stability straps and a hand grip attached thereto to be used by an assistant to help the user reach a standing or laying down locked position.

2. Description of Related Art

To use a conventional inversion table, a person lies on a backrest thereof to relax or relieve back pain. The conventional inversion backrest has a mounting bracket, a backrest and an ankle clamp assembly. The backrest is pivotally attached to the mounting bracket. The ankle clamp assembly is connected to the backrest to clamp and hold a person's ankles when the backrest is pivoted to an inverted position.

When a person uses the conventional inversion table to invert, it is assumed the person has full use of their upper extremities and can invert the table themselves rotating the backrest at a specified inverted angle, touching the ground using the person's hands to hold the backrest perpendicular to the ground and to obtain an optimum inversion effect. This is not possible for those with certain disabilities and can also be extremely dangerous. In addition, when the person wants to rotate the backrest to return upright, the person has to hold the side bars of the mounting bracket to obtain an upward reverse force to rotate the backrest and be able to maintain that position, but this is difficult and may be impossible for those with certain disabilities who do not have strength in their arms and/or legs to maintain this upright posture nor is there any way to lock in to this position. Furthermore, an inversion table does not provide a way for a person's body to be immobilized and harnessed onto the table for safety and stability if the person is not able to hold their body up against the inversion table.

The present invention provides a standing table that mitigates or obviates the aforementioned problems.

SUMMARY OF THE INVENTION

The main objective of the present invention is to provide a standing device so that those with disabilities that are unable to move their extremities (paraplegics, quadriplegics, those suffering from ALS, or those that have temporarily lost the ability to walk or stand on their own because they have suffered an accident or sickness such as COVID-19, etc.) can be able to stand, be moved in a standing position and when needed, can be inverted to maintain blood flow to the upper extremities.

The disability standing device in accordance with the present invention has a mounting bracket, a backrest with strap holes for a removable cushion to be tied onto and for better grasping of the backrest, arm rests, an ankle clamp assembly, wheels with locks, a support rod, grip handles, a grip bar and a locking device. The mounting bracket has a rear supporting frame and a front supporting frame to form a triangular form. The mounting bracket has grip handles facing the rear on the tops of the triangular forms. The backrest is connected pivotally to the rear supporting frame and is bordered with holes for gripping, placement of interlocking stability straps and placement of straps of a removable cushion for comfort. The ankle clamp assembly is securely connected to the backrest to clamp and hold a person's ankles. The support rod is mounted on the rear supporting frame of the mounting bracket at a position opposite to the ankle clamp assembly and slightly higher. The locking device to keep the backrest locked in position is located at the apex of the front supporting frame and the rear supporting frame. The mounting bracket has two arm rests that lay beside the backrest on each side. The support rod is mounted perpendicular on the rear supporting frames. The wheels with locks are below each rear and front leg frame to provide mobility with the option to lock the whole device in place.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
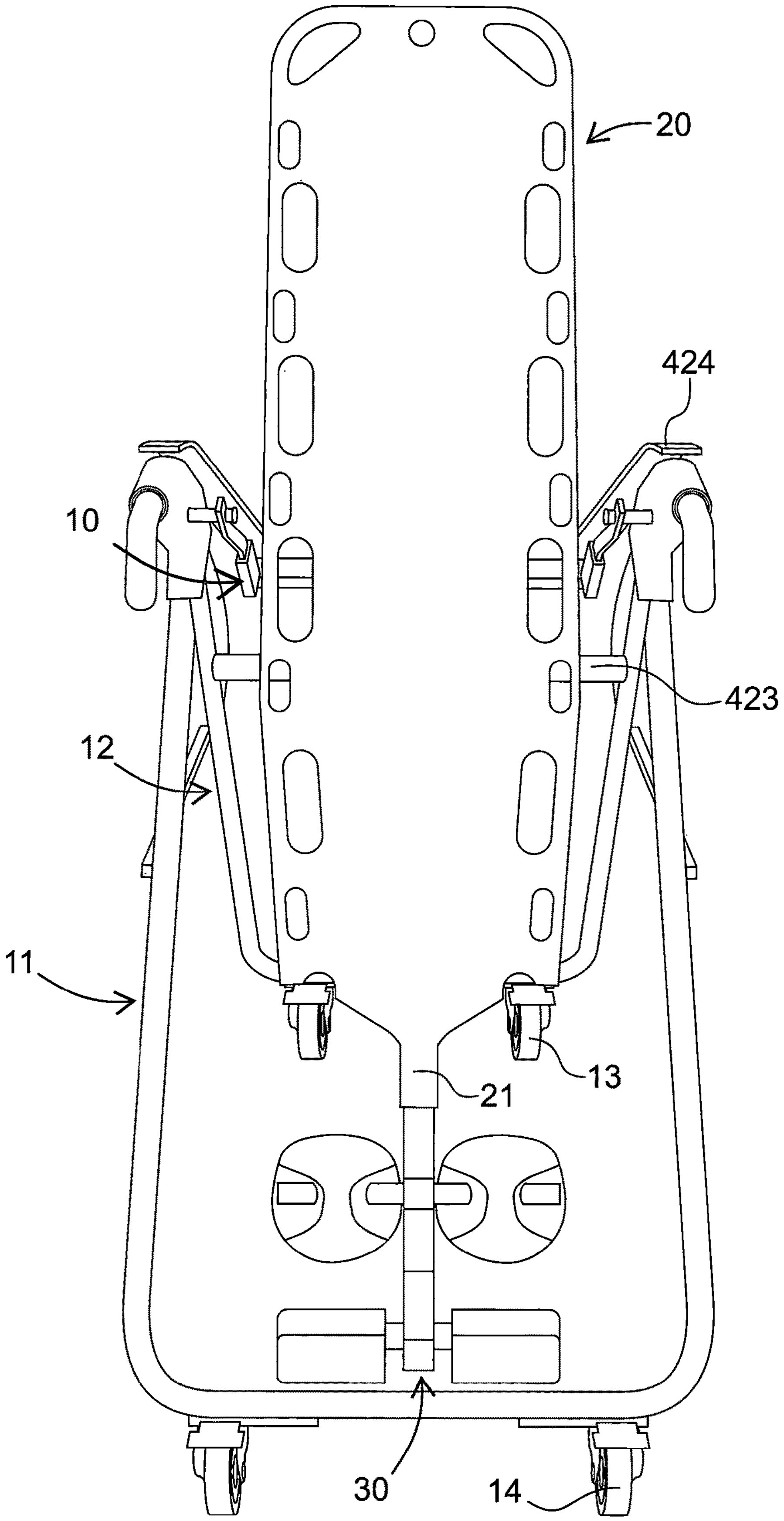
FIG. 1 is a perspective view of the disability standing device in accordance with the present invention.
Figure 2:
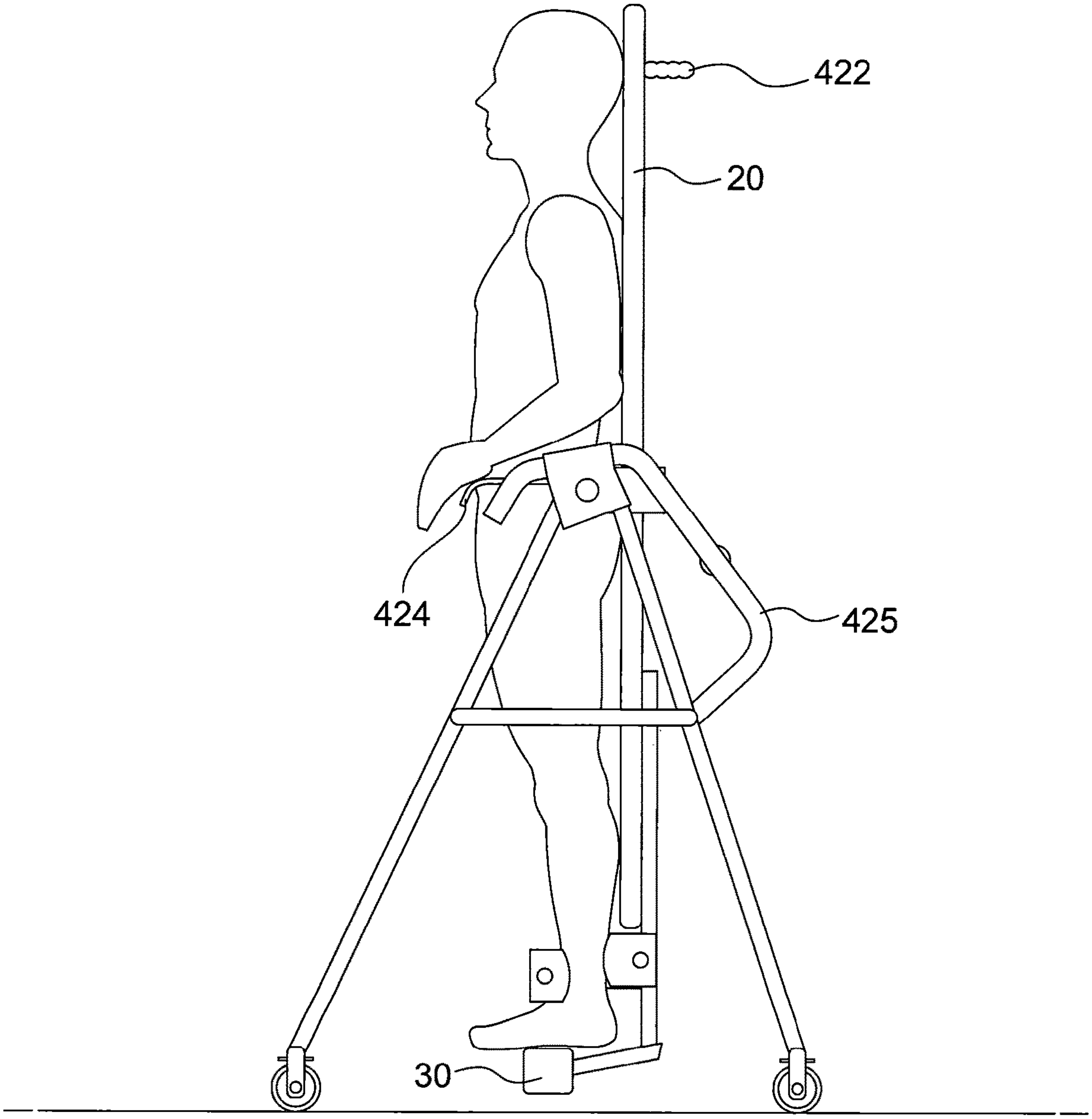
FIG. 2, FIG. 3 and FIG. 4 are operational perspective views of the disability standing device in FIG. 1.

With reference to FIG. 1, disability standing device in accordance with the present invention has a mounting bracket, a backrest with strap holes, arm rests, an ankle clamp assembly, wheels with locks, a support rod, grip handles, a grip bar and a locking device.

The mounting bracket (10) has a U-shaped rear supporting frame (12) and a U-shaped front supporting frame (11) to form a triangle. The front supporting frame (11) is respectively and securely attached to the rear supporting frame (12) near the free ends. Wheels with locks are attached to the rear (13) and front (14) supporting frames for mobility.

The backrest with strap holes (20) is connected pivotally to the rear supporting frame (12) of the mounting bracket (10) and has a connecting arm (21). The connecting arm (21) is adjustably connected to the bottom end of the backrest (20) and has a connecting end.

The ankle clamp assembly (30) is securely connected to the connecting end of the connecting arm (21) of the backrest (20) to clamp and hold a person's ankles.

Figure 3:
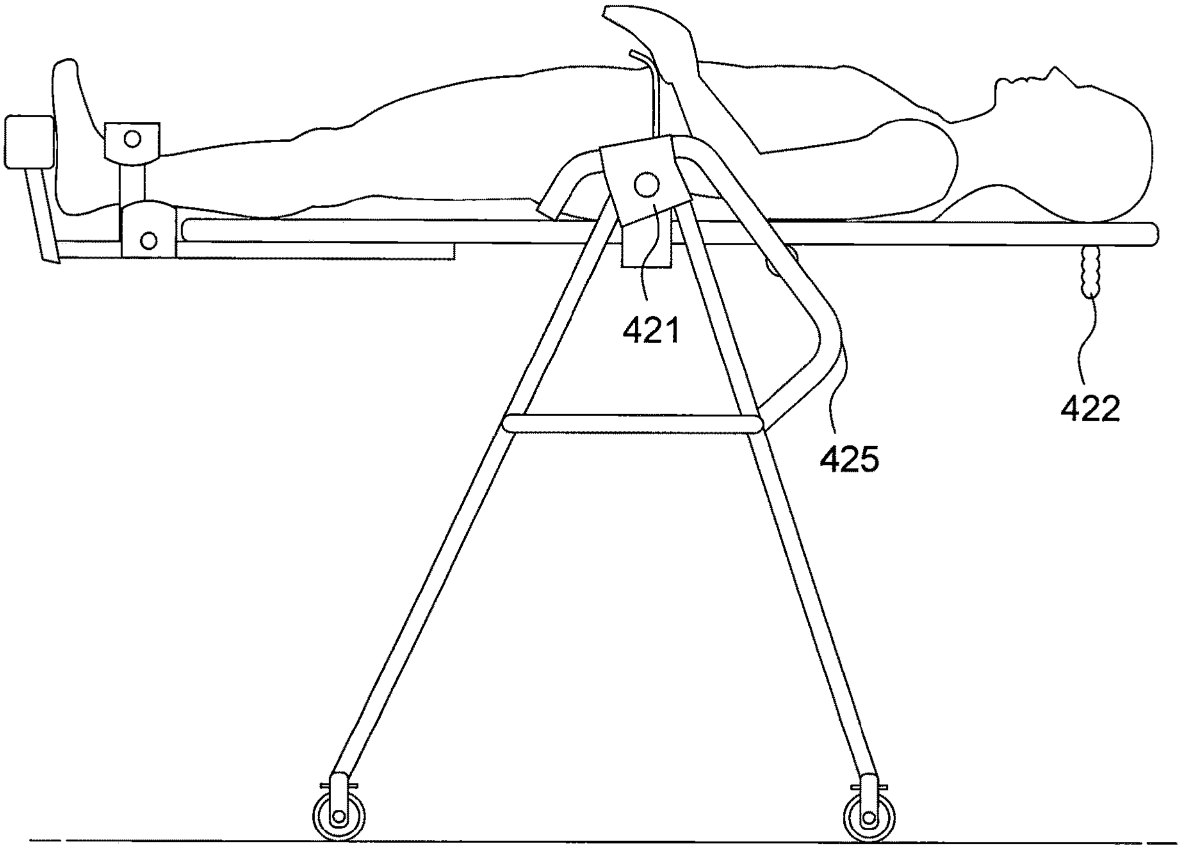
Figure 4:
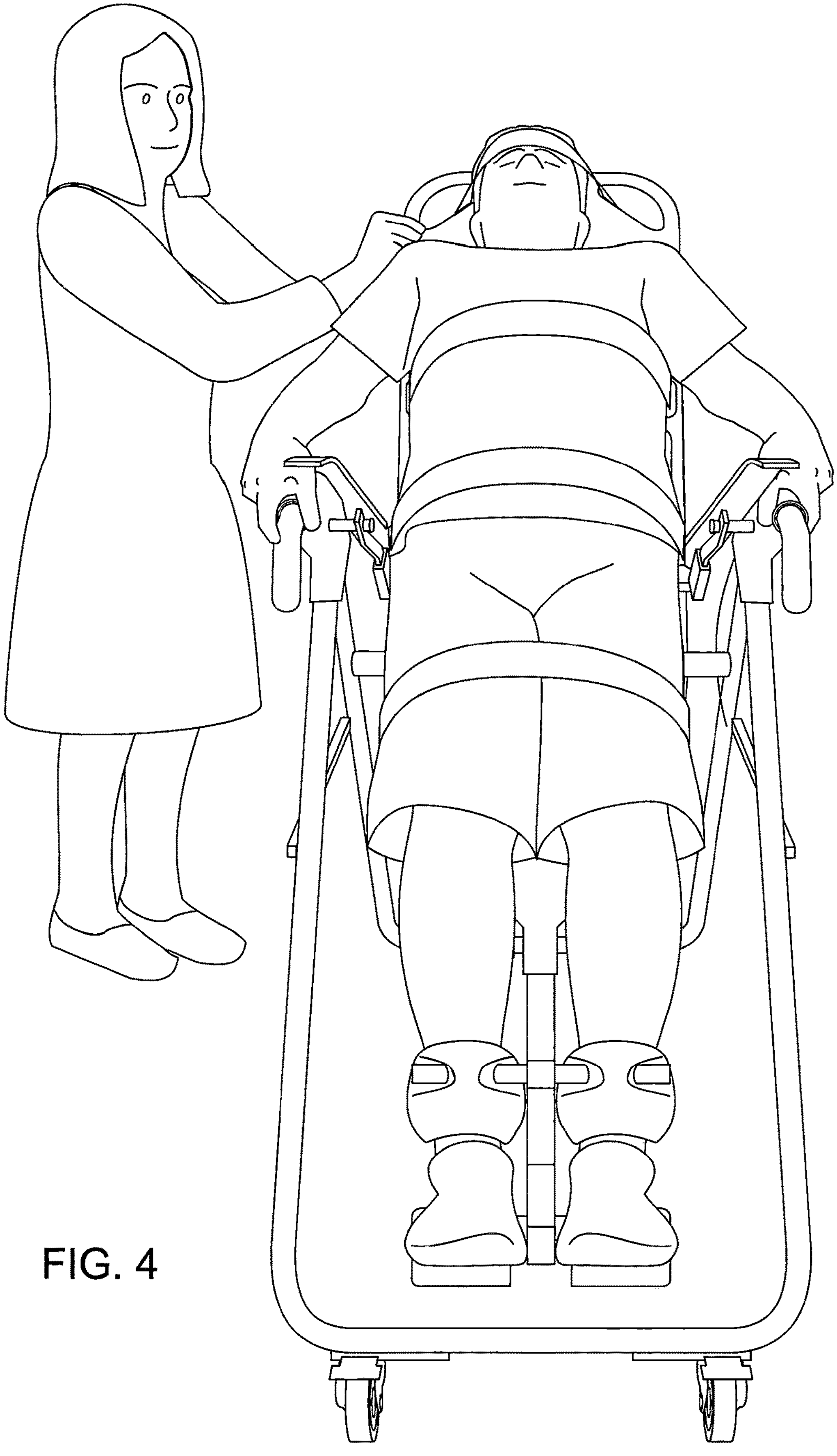

With reference to FIG. 3, when a person uses the standing disability device to invert, the assistant can pull the grip bar (422) to make the backrest (20) reach a slightly inverted angle to the ground. If desired to secure the person in this inverted position, the assistant can lock this inverted position in place using the locking device (421) located on one side at the apex of the rear supporting frame (12) and the front supporting frame (11). This inverted locked position may also be desired by some users for assistants to have easier accessibility of the device to mount a user on the device as oppose to mounting a user on the device when the device is in a locked upright position. Accordingly, an optimum inversion effect is thus provided. When the user wants to recover to an upright position, the assistant can push the grip bar (422) or the backrest (20) to obtain an upward reverse force to rotate the backrest (20) to the original position. If desired to secure the person in this upright position, the assistant can lock this upright position in place using the locking device (421) located on one side at the apex of the rear supporting frame (12) and the front supporting frame (11). A support rod (423) is located at the top of the rear supporting frame (12) to hinder a user from an inverted position greater than parallel to the floor as shown in FIG. 3. Arm rests (424) are provided to support the arms when the user is in the upright position. Grip handles (425) are also provided to support the user and allow the caretaker to push or pull the user after the user is locked in the desired position.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

The invention claimed is:

1. A disability standing device comprising: a mounting bracket and a rear and front supporting frame being U-shaped; wherein the rear and front supporting frames each have a bottom side, and two wheels connected to each of the respective bottom sides; and a supporting rod attached to the rear frame towards a top side; the supporting rod directly connected to the rear supporting frame, wherein the supporting rod is configured to hinder a backrest and a user positioned there upon from inverting to a position greater than parallel to a floor, and a locking device on an apex of the rear and front supporting frame; and having armrests on each side of the backrest attached to the mounting bracket; and having grip handles on each side of the backrest attached to the rear and front supporting frame; and the backrest having strap holes bordering all the way around a perimeter of the backrest and having a grip bar attached to the upper back side; and connected pivotally to a plurality of pivotal elements of the rear supporting frame of the mounting bracket and the backrest having a bottom end; and a connecting arm adjustably connected to the bottom end of the backrest and having a connecting end; an ankle clamp assembly securely connected to the connecting end of the connecting arm of the backrest to clamp and hold the user's ankles.

2. The disability standing device of claim 1, wherein the backrest supports the user, the user being a person with an injury, a patient, or a disabled individual, and the backrest further configured to support the user in a standing position and be mobile or stationary in the standing position.

3. The disability standing device of claim 2, wherein the user further utilizes the device to relax, relieve back pain or lay down to help with blood flow after standing for a period of time and be mobile or stationary in this position.

* * * * *